(12) United States Patent
Fukuda et al.

(10) Patent No.: US 11,173,890 B2
(45) Date of Patent: Nov. 16, 2021

(54) POWER REGENERATION SYSTEM FOR WORK VEHICLE

(71) Applicant: HITACHI CONSTRUCTION MACHINERY CO., LTD., Tokyo (JP)

(72) Inventors: Naoki Fukuda, Tsuchiura (JP); Masatsugu Arai, Kasumigaura (JP); Yukiaki Shimizu, Hitachi (JP); Takaaki Tanaka, Tsuchiura (JP); Shintarou Tanaka, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 266 days.

(21) Appl. No.: 16/490,986

(22) PCT Filed: Feb. 23, 2018

(86) PCT No.: PCT/JP2018/006828
§ 371 (c)(1),
(2) Date: Sep. 4, 2019

(87) PCT Pub. No.: WO2019/163112
PCT Pub. Date: Aug. 29, 2019

(65) Prior Publication Data
US 2020/0017096 A1 Jan. 16, 2020

(51) Int. Cl.
*B60W 20/00* (2016.01)
*B60K 6/46* (2007.10)
(Continued)

(52) U.S. Cl.
CPC ............... *B60W 20/00* (2013.01); *B60K 6/46* (2013.01); *B60L 1/00* (2013.01); *B60W 50/00* (2013.01);
(Continued)

(58) Field of Classification Search
CPC ................ B60W 20/00; B60W 50/00; B60W 2050/0026; B60W 2300/125;
(Continued)

(56) References Cited

U.S. PATENT DOCUMENTS 10,717,361 B2 * 7/2020 Nishinaka ............. B60L 53/305
2010/0051359 A1 3/2010 Fushiki et al.

FOREIGN PATENT DOCUMENTS

JP 09-215362 A 8/1997
JP 10-290522 A 10/1998
(Continued)

OTHER PUBLICATIONS

International Search Report of PCT/JP2018/006828 dated May 22, 2018.

*Primary Examiner* — Gertrude Arthur Jeanglaude
(74) *Attorney, Agent, or Firm* — Mattingly & Malur, PC

(57) ABSTRACT

To provide a power regeneration system for a working vehicle that can effectively use a regenerative electric energy.

A first electric circuit for supplying an electric power generated by the first generator to a traveling motor, a voltage detector for detecting an actual voltage of the first electric circuit, a second electric circuit for supplying an electric power generated by a second generator to an auxiliary device, a step-down device connected to the first electric circuit and the second electric circuit, and a controller are provided. The controller estimates the voltage of the first electric circuit after a predetermined time has elapsed from the present time, based on information on a traveling state of a work vehicle and the actual voltage detected by the voltage detector, and outputs a drive command to the step-down device when the estimated voltage is equal to or more than a threshold.

5 Claims, 9 Drawing Sheets

(51) Int. Cl.
*B60L 1/00* (2006.01)
*B60W 50/00* (2006.01)

(52) U.S. Cl.
CPC ............... *B60W 2050/0026* (2013.01); *B60W 2300/125* (2013.01); *B60W 2510/081* (2013.01); *B60W 2510/083* (2013.01); *B60W 2510/18* (2013.01); *B60Y 2200/142* (2013.01); *B60Y 2200/92* (2013.01)

(58) Field of Classification Search
CPC ..... B60W 2510/081; B60W 2510/083; B60W 2510/18; B60K 6/46; B60L 1/00; B60Y 2200/142; B60Y 2200/92
USPC .......................................................... 701/22
See application file for complete search history.

(56) References Cited

FOREIGN PATENT DOCUMENTS

| | | | |
|---|---|---|---|
| JP | 2002-101693 | A | 4/2002 |
| JP | 2003-074685 | A | 3/2003 |
| JP | 2010-188800 | A | 9/2010 |
| JP | 2014-054117 | A | 3/2014 |
| JP | 2015-073409 | A | 4/2015 |

\* cited by examiner

POWER REGENERATION SYSTEM FOR WORK VEHICLE

TECHNICAL FIELD

The present invention relates to a power regeneration system for a work vehicle.

BACKGROUND ART

In a dump truck, which is an example of a work vehicle, there is an electrically driven dump truck that travels by driving a traveling motor with an electric power generated by a generator mechanically connected to an engine. The electrically driven dump truck of this type is used, for example, in a mine, and at the time of deceleration, the traveling motor is driven as the generator to convert a vehicle body kinetic energy into an electric energy and performs a regenerative operation to obtain a braking force. If the electric energy regenerated (generated) by the traveling motor is not consumed, a braking performance is reduced, and therefore there is a need to consume the regenerated electric energy in some way.

As a technique for consuming the regenerated electric energy, for example, Patent Literature 1 discloses a configuration of "in a power conversion system for an electric vehicle including a discharge dedicated circuit that discharges electric charge stored in a smoothing capacitor, a control circuit that controls the power conversion system for the electric vehicle includes a discharge control section that drives a DC/DC converter to feed the electric charge stored in the smoothing capacitor to an auxiliary device or a DC auxiliary power supply of the vehicle and discharges the electric charge when the control circuit detects a failure in a discharge dedicated circuit (refer to Abstract).

CITATION LIST

Patent Literature

[PATENT LITERATURE 1] Japanese Patent Application Laid-Open Publication No. 2015-073409

SUMMARY OF INVENTION

Technical Problem

However, in the electrically driven dump truck for mines, an electric power regenerated by the traveling motor is much larger than an electric power required for the auxiliary devices. For that reason, a method of consuming all the electric energy regenerated by the traveling motor with an auxiliary device as in Patent Literature 1 cannot be applied. Moreover, in Patent Literature 1, a timing at which to drive the DC/DC converter (step-down device) is only when a failure of a resistor is detected, and an opportunity which consumes the electric energy regenerated by the traveling motor by the auxiliary device is small. The electric energy regenerated by the traveling motor cannot be used effectively.

Therefore, an object of the present invention is to provide a power regeneration system for a work vehicle which can effectively utilize a regenerated electric energy even when the electric energy regenerated by a traveling motor is larger than an output of an accessory machine.

Solution to Problem

In order to solve the above problem, according to an aspect of the present invention, there is provided a power regeneration system for a work vehicle including: a first generator and a second generator which are driven by an engine; a first electric circuit for supplying an electric power generated by the first generator to a traveling motor to a driving wheel of the work vehicle; a resistor that is connected to the first electric circuit and converts an electric energy generated at the time of braking of the traveling motor into a heat energy and radiates the heat energy; a voltage detector that detects an actual voltage of the first electric circuit; a second electric circuit for supplying an electric power generated by the second generator to the auxiliary device of the work vehicle; a step-down device that has a high voltage side connected to the first electric circuit and a low voltage side connected to the second electric circuit, and supplies the electric power from the first electric circuit to the second electric circuit; and
a controller that controls driving of the step-down device, in which the controller includes: a resistor drive determination section that determines whether or not the actual voltage is equal to or more than a predetermined threshold, and outputs a drive command to the resistor when the actual voltage becomes equal to or more than the threshold; a traveling state determination section that determines whether or not the traveling motor performs the regenerative operation, based on information on a traveling state of the work vehicle; a voltage estimation section that estimates a voltage of the first electric circuit after a predetermined time from the present time, based on the information on the traveling state of the work vehicle and the actual voltage detected by the voltage detector; a step-down device drive determination section that determines whether or not the voltage estimated by the voltage estimation section is equal to or more than the threshold, and determines that the step-down device is driven when the voltage estimated by the voltage estimation section is equal to or more than the threshold; and a step-down device control section that outputs a drive command to the step-down device when the traveling state determination section determines that the traveling motor performs the regeneration operation and the step-down device drive determination section determines that the step-down device is driven.

Advantageous Effects of Invention

According to the present invention, even when the electric energy regenerated by the traveling motor is larger than the output of the auxiliary device, the regenerated electric energy can be effectively used. In addition, the problems, the configurations, and the effects except for those mentioned above will be clarified by description of the following embodiment.

DESCRIPTION OF EMBODIMENTS

Figure 1:
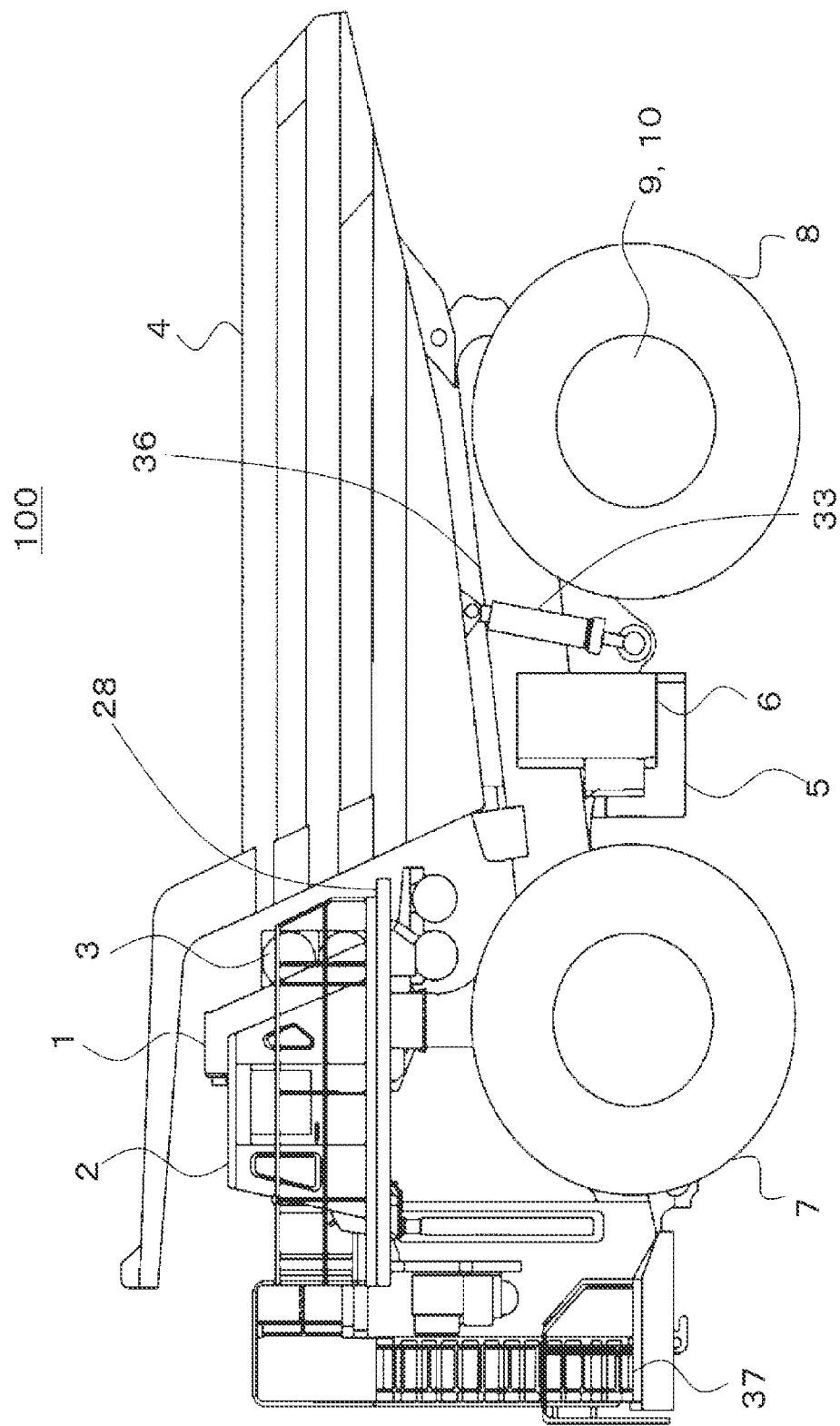
FIG. 1 is a side view of a dump truck that is a representative example of a work vehicle.

Hereinafter, embodiments of the present invention will be described with reference to the drawings. In the drawings, the same elements will be denoted by the same reference symbols and redundant description will be omitted.

First Embodiment

Hereinafter, a power regeneration system for a work vehicle according to a first embodiment of the present invention will be described. The power regeneration system according to the first embodiment of the present invention is an example applied to a dump truck that is a typical example of a work vehicle.

(Appearance of Dump Truck 100)

FIG. 1 is a side view of a dump truck which is a typical example of the work vehicle. In a dump truck 100, a body (also referred to as a vessel) 4 for loading soil and the like is mounted on a frame 36, and both the frame 36 and the body 4 are connected to each other by hoist cylinders 33. The expansion and contraction operation of the hoist cylinders 33 rotate the body 4 in a vertical direction. In addition, front wheels 7, rear wheels 8, a hydraulic oil tank 6, and a fuel tank 5 are attached to the frame 36 through mechanical parts (not shown). A rotating shaft portion of each rear wheel 8 houses a traveling motor 10 for driving the rear wheel 8 and a reduction gear 9 which mechanically connects the rear wheel 8 and the traveling motor 10. The front wheels 7, the rear wheels 8, the traveling motors 10, and the reduction gears 9 are provided as a pair on the left and right, and in the following description, "L" and "R" are appropriately added after the reference numerals to distinguish the left and right.

Further, a deck 28 on which an operator can walk is attached to the frame 36. On an upper surface of the deck 28 are mounted a cab 2 on which the operator rides to operate the dump truck 100, a control cabinet 1 in which various power devices are stored, and a plurality of grid boxes 3 for dissipating an excess energy as a heat. Further, in FIG. 1, in a portion hidden by the front wheels 7, an engine 11 and a main generator (first generator) 12 as an electric power source for a traveling motor, an auxiliary generator as an electric power source for an auxiliary device (second generator) 13, and a main pump (not shown) as a hydraulic pressure source for hydraulic equipment are mounted.

(Method of Operating the Dump Truck 100)

Next, a method of operating the dump truck 100 will be described. In the cab 2, an accelerator pedal, a brake pedal, a hoist lever, and a steering wheel (not shown) are provided. The operator can control an acceleration force and a braking force of the dump truck 100 by the depression amount of the accelerator pedal and the brake pedal in the cab 2. Further, the operator can perform a steering operation by a hydraulic drive by rotating the steering wheel to the left and right, and perform body elevating operation by the hydraulic drive by beat hoist lever back and forth. The system for steering operation and body lifting operation is the same as in the prior art, and therefore, will not be described in detail in this embodiment.

(Configuration of the Electric Power Regeneration System of the Dump Truck 100)

Figure 2:
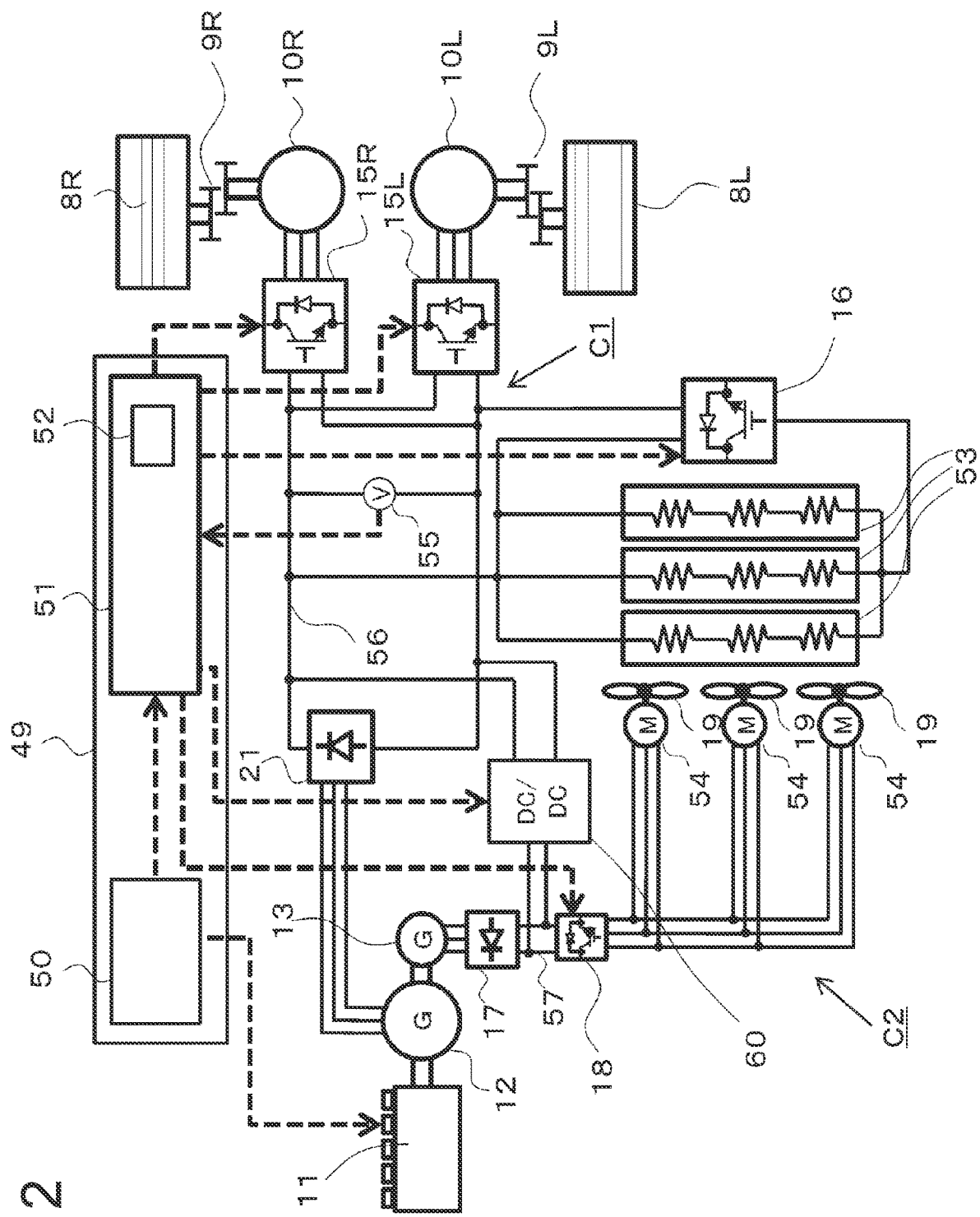
FIG. 2 is a configuration diagram of a power regeneration system for a dump truck according to the present embodiment.

FIG. 2 is a block diagram of the electric power regeneration system for the dump truck according to the present embodiment. As shown in FIG. 2, the power regeneration system of the dump truck 100 is roughly configured by an engine 11, a main generator 12, an auxiliary generator 13, a first electric circuit C1, a second electric circuit C2, and a DC/DC converter (step-down device) 60 and a controller 49. The main generator 12 and the auxiliary generator 13 are mechanically connected to the engine 11 and driven by the engine 11.

The first electric circuit C1 supplies an electric power generated by the main generator 12 to traveling motors 10L and 10R connected to rear wheels (driving wheels) 8L and 8R of the dump truck 100. The second electric circuit C2 supplies the electric power generated by the auxiliary generator 13 to grid box fan motors (auxiliary motors) connected to grid box fans (auxiliary device) 19 of the dump truck 100.

A high voltage side of the DC/DC converter 60 is connected to the first electric circuit C1, and the low voltage side is connected to the second electric circuit C2. Then, the DC/DC converter 60 supplies an electric power from the first electric circuit C1 to the second electric circuit C2.

In the first electric circuit C1, a three-phase AC output of the main generator 12 is input to high voltage DC line inverters 15L and 15R through a main generator diode bridge 21 and a high voltage DC line 56, and the outputs of the high voltage DC line inverters 15L and 15R are connected to the traveling motors 10L and 10R, respectively. The output shafts of the traveling motors 10L and 10R are mechanically connected to rear wheels 8L and 8R through reduction gears 9L and 9R, respectively. Further, the high voltage DC line 56 is connected to the grid box resistors 53 and the chopper 16 in addition to DC input sections of the high voltage DC line inverters 15L and 15R described above. The high voltage DC line 56 is also connected to a voltmeter (voltage detector) 55 for detecting a voltage.

On the other hand, a three-phase AC output of the auxiliary generator 13 is input to the auxiliary device DC line inverter 18 through an auxiliary generator diode bridge 17 and an auxiliary device DC line 57, and an output of the auxiliary device DC line inverter 18 is connected to multiple grid box fan motors 54. The output shafts of the grid box fan motors 54 are mechanically connected to the grid box fans 19.

The controller 49 includes a main controller 50 and a power controller 51. Although not shown, the controller 49 is configured by hardware including a CPU (Central Processing Section), a storage device 52 such as a ROM (Read Only Memory) or an HDD (Hard disc Drive) for storing various programs for executing processing by the CPU, and a RAM (Random Access Memory) which is a work area when the CPU executes the programs.

The main controller 50 integrally controls the engine 11 and the power controller 51 based on a state of the dump truck 100 and an operation input of the operator. The power controller 51 inputs on-off signals appropriately to respective semiconductor switches (not shown) of the high voltage DC line inverters 15L, 15R, the chopper 16, and the auxiliary device DC line inverter 18 under the control of the main controller 50, and drives the traveling motors 10L and 10R, the grid box resistance (resistor) 53, and the grid box fan motors 54 with appropriate timing and appropriate output, to thereby control a flow of the electric power of the first electric circuit C1 and the second electric circuit C2.

Although will be described in detail later, the power controller 51 determines whether or not the dump truck 100 travels in a traveling state in which the regenerative power is obtained, that is, determines whether or not the traveling motors 10L and 10R to control the drive of the DC/DC converter 60.

Next, a detailed flow of the electric power generated by the main generator 12 will be described. When the main generator 12 is driven by the engine 11, the generated three-phase AC voltage is converted in to a DC voltage by the main generator diode bridge 21 and the DC voltage is input to the high voltage DC line inverters 15R and 15L through the high voltage DC line 56. In this state, when the operator depresses an accelerator pedal or an accelerator signal is output to the power controller 51 by an autonomous driving function, the power controller 51 inputs a control signal for acceleration to the high voltage DC line inverters 15L and 15R, and supplies an electric power to the traveling motors 10L and 10R. The traveling motors 10L and 10R drive the rear wheels 8L and 8R through the reduction gears 9L and 9R by the electric power to move a vehicle body forward or backward.

On the other hand, when the operator depresses the brake pedal to perform the braking operation at the time of downhill or stop, or when a brake signal is output to the power controller 51 due to the autonomous driving function (refer to FIG. 3), the power controller 51 inputs a control signal for deceleration to the high voltage DC line inverters 15L and 15R, and the traveling motors 10L and 10R convert a kinetic energy of the vehicle body into an electric energy. In other words, the traveling motors 10L and 10R operate as generators. At this time, a torque is generated in the traveling motors 10L and 10R in a direction opposite to the rotation direction. When the voltage of the high voltage DC line 56 rises due to the generated electric energy, the power controller 51 operates the chopper 16 to supply the electric power to the grid box resistors 53.

As a result, a surplus electric power generated by the regeneration operation of the traveling motors 10L and 10R is consumed by converting an electric energy into a heat by applying a DC voltage to grid box resistors 53. The heat of the grid box resistors 53 is normally air cooled naturally by the surrounding atmosphere. However, when the heat generation amount is large, a temperature of the grid box resistors 53 rises, which may cause a damage due to a high temperature. For that reason, the power controller 51 drives the grid box fan motors 54 to cool the grid box resistors 53 by forced air cooling.

Next, a method of driving the grid box fan motors 54 will be described. When the auxiliary generator 13 is driven by the engine 11, the generated three-phase AC voltage is converted into a DC voltage by the diode bridge 17 for the auxiliary generator, and the DC voltage is input to the auxiliary device DC line inverter 18 through the auxiliary device DC line 57. When the grid box resistors 53 need to be cooled, a control signal for driving the grid box fan motors is input from the power controller 51 to the auxiliary device DC line inverter 18, and the electric power is supplied to the grid box fan motors 54. This power causes the grid box fan motors 54 to rotate the mechanically connected grid box fans 19.

At this time, although the details will be described later, the power controller 51 performs calculation to estimate the input voltage after a predetermined time to the high voltage DC line inverters 15L and 15R from the amount of power generation of the traveling motors 10L and 10R. At a point of time when an estimated voltage V* becomes equal to or higher than a threshold Vth, the power controller 51 outputs a control signal for operating the grid box fans 19 to the DC/DC converter 60. The DC/DC converter 60 converts a voltage of the high voltage DC line 56 into a voltage of the auxiliary device DC line 57 based on the input of the control signal from the power controller 51 and applies the converted voltage to the auxiliary device DC line inverter 18.

As a result, the electric power generated by the traveling motors 10L and 10R is sent to the grid box fans 19 before flowing into the grid box resistors 53 through the chopper 16, and consumed by the grid box fans 19, thereby being capable of not only effectively using the electric power generated by the traveling motors 10L and 10R but also delaying the operation of the chopper 16 by inhibiting a voltage rise of the high voltage DC line 56, which makes it possible to inhibit the heat generation of the grid box resistors 53 and to extend the lifetime of the grid box resistors 53.

Figure 3:
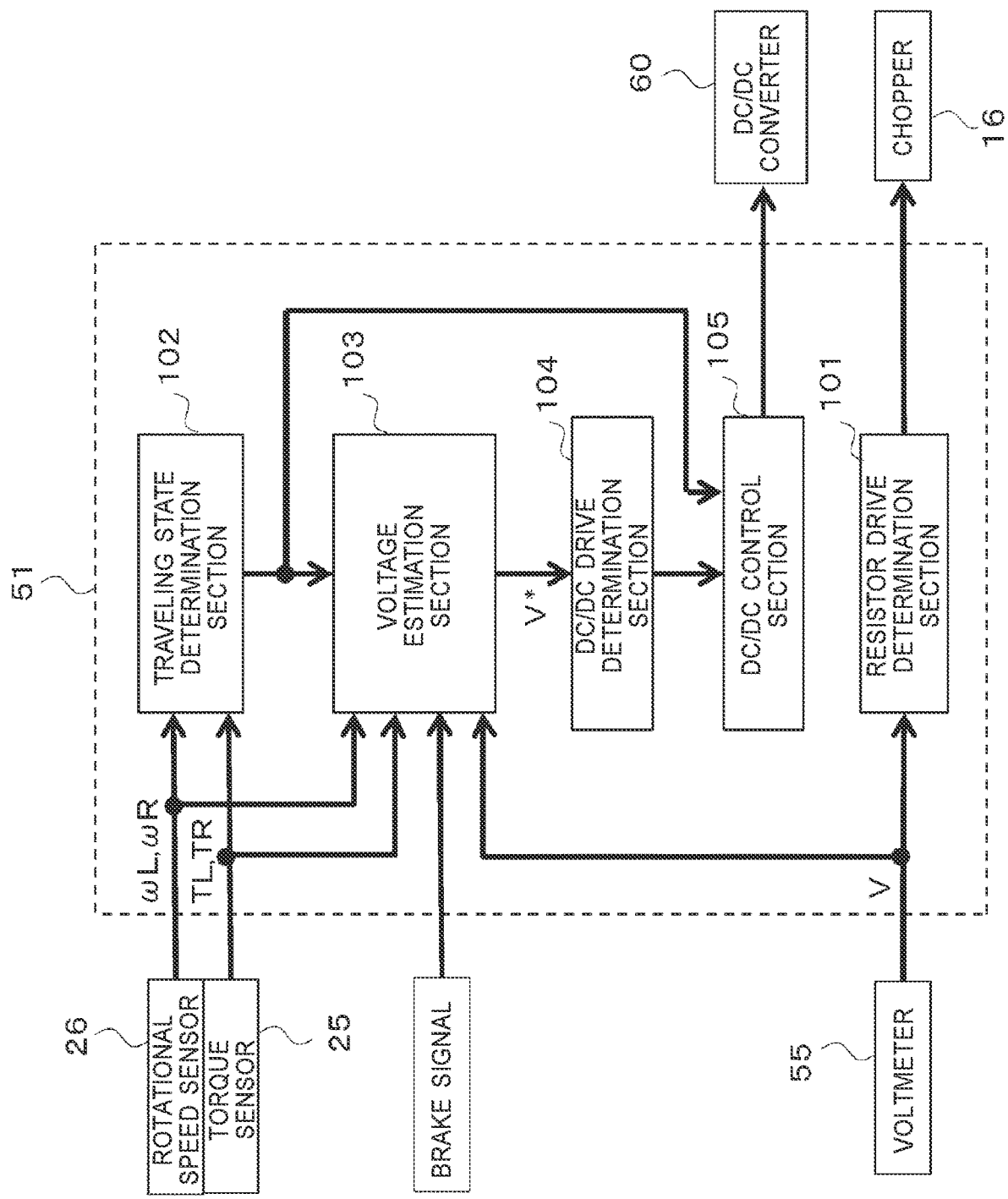
FIG. 3 is a block diagram showing an internal configuration of a power controller.

Next, the functions in the power controller 51 will be described with reference to FIG. 3. FIG. 3 is a block diagram showing an internal configuration of the power controller 51. As shown in FIG. 3, the power controller 51 includes a resistor drive determination section 101, a traveling state determination section 102, a voltage estimation section 103, a DC/DC drive determination section (step-down device drive determination section) 104, and a DC/DC control section (step-down device control section) 105.

The resistor drive determination section 101 determines whether or not the actual voltage V of the high voltage DC line 56 (first electric circuit C1) output by the voltmeter 55 exceeds the threshold Vth, and outputs a drive command to the chopper 16 when the actual voltage V exceeds the threshold Vth. The traveling state determination section 102 determines whether or not the traveling motors 10L and 10R are performing a regenerative operation based on the information related to the traveling state of the dump truck 100. Specifically, the traveling state determination section 102 determines whether the positive and negative signs of output values of the torque sensor 25 for detecting the output torque of the traveling motors 10L and 10R, and the rotational speed sensor 26 for detecting the rotational speeds of traveling motors 10L and 10R (torque: TL, TR/rotational speed: $\omega L$, $\omega R$) match each other (details will be described later), and if not matching, the traveling state determination section 102 assumes that the traveling motors 10L and 10R generate the electric power, that is, the regeneration operation is performed, and transmits an operation command to the voltage estimation section 103. In this example, the suffixes L of the torque T and the rotational speed $\omega$ indicate the torque and the rotational speed of the left traveling motor 10L, and the subscripts R indicate the torque and the rotational speed of the right traveling motor 10R. The torque sensor 25 and the rotational speed sensor 26 are provided on the traveling motors 10L and 10R, though not shown.

When the determination result that the traveling motors 10L and 10R perform the regenerative operation is input from the traveling state determination section 102, the voltage estimation section 103 estimates a tendency of a change in the voltage of the high voltage DC line 56 according to the outputs (TL, TR) of the torque sensor 25, the outputs ($\omega L$, $\omega R$) of the rotational speed sensor 26, and the actual voltage V output from the voltmeter 55, estimates the voltage V* of the high voltage DC line 56 after a predetermined time ts from the current time (reference time), and outputs the estimated voltage V* to the DC/DC drive determination section 104.

The DC/DC drive determination section 104 compares the voltage V* of the high voltage DC line 56 after the predetermined time ts estimated by the voltage estimation section 103 with the threshold Vth, and outputs a DC/DC converter drive command to the DC/DC control section 105 when the voltage V* is equal to or higher than the threshold Vth.

Upon receiving the determination result that the traveling motors 10L and 10R perform the regenerative operation from the traveling state determination section 102, and receiving the DC/DC converter drive command from the DC/DC drive determination section 104, the DC/DC control section 105 controls the DC/DC converter 60 so as to set the output voltage of the DC/DC converter 60 to a desired voltage. As a result, the electric power is supplied from the high voltage DC line 56 (first electric circuit C1) to the auxiliary device DC line 57 (second electric circuit C2) through the DC/DC converter 60.

Figure 4:
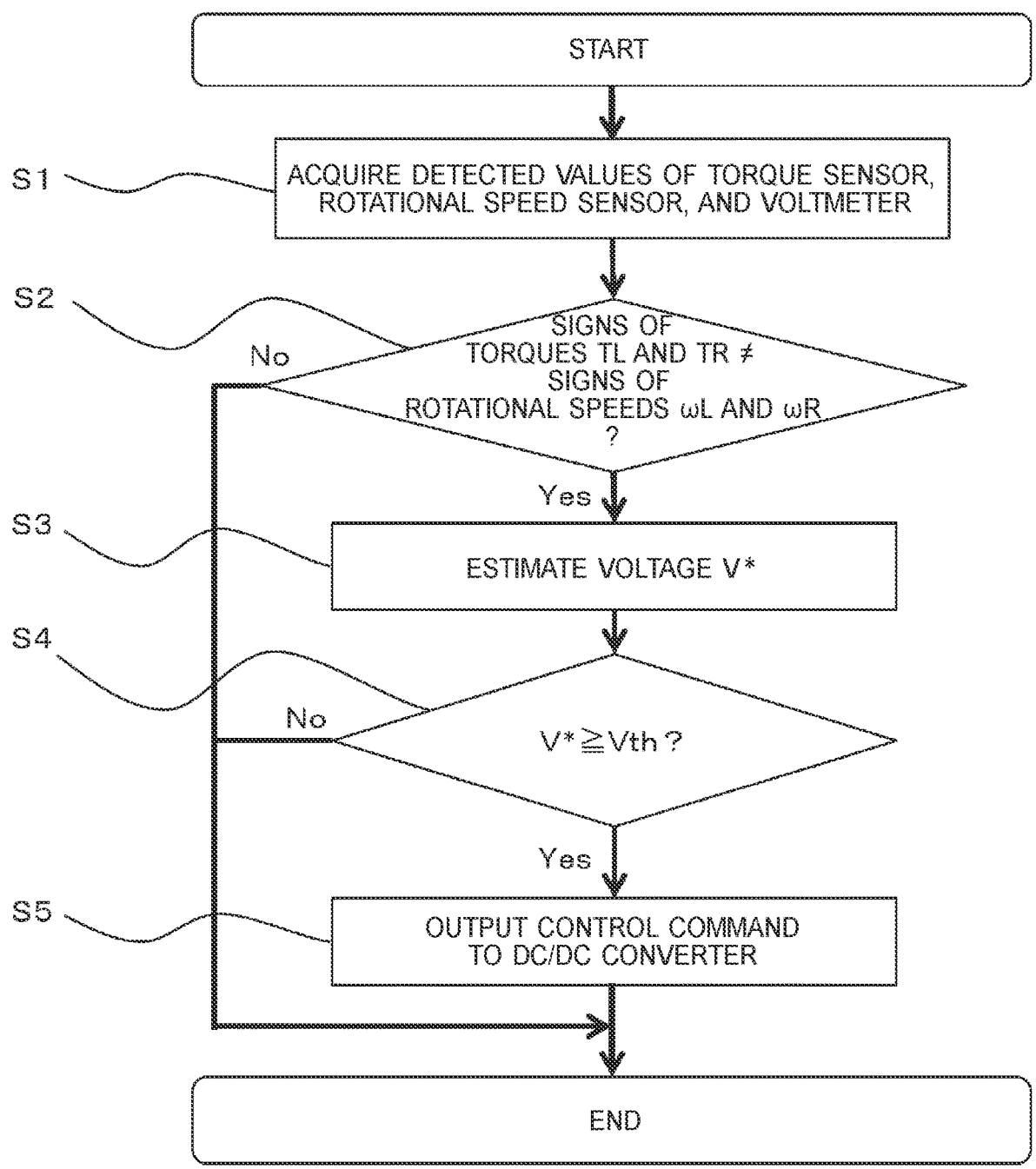
FIG. 4 is a flowchart showing a procedure of a control process of a DC/DC converter.

Next, the control process of the DC/DC converter 60 executed by the power controller 51 will be described with reference to FIG. 4. FIG. 4 is a flowchart illustrating a procedure of a control process of the DC/DC converter.

The power controller 51 starts the processing operation together with the activation of the vehicle body (for example, the key switch on of the engine 11). In Step S1, the traveling state determination section 102 acquires the traveling state of the vehicle body from the torque sensor 25 and the rotational speed sensor 26, that is, the torques TL and TR and the rotational speeds ωL and ωR of the traveling motors 10L and 10R. Also, the voltage estimation section 103 and the resistor drive determination section 101 acquire the actual voltage V of the high voltage DC line 56 from the voltmeter 55.

In Step S2, the traveling state determination section 102 determines whether or not the positive and negative signs of the torque TL and TR of the traveling motors 10L and 10R match the positive and negative signs of the rotational speeds ωL, and ωR, thereby determining whether or not the power generation is performed by the traveling motors 10L and 10R. If the traveling motors 10L and 10R are in a powering operation while the vehicle body is accelerated forward, the signs of the torque and the rotational speed are both positive and match each other. On the other hand, when the vehicle is decelerated forward and the traveling motors 10L and 10R are in the regeneration operation, the sign of the torque is negative and the sign of the rotational speed is positive and do not match each other. Similarly, during reverse acceleration, both the signs of the torque and the rotational speed are negative and match each other, and during the reverse deceleration, the torque is positive and the rotational speed is negative, and the signs of the torque and the rotational speed do not match each other.

If the signs do not match each other (Yes in S2), the traveling state determination section 102 determines that power generation is performed by the traveling motors 10L and 10R, and the process proceeds to Step S3. On the other hand, when the signs match each other (No in S2), the traveling state determination section 102 determines that the power generation is not performed by the traveling motors 10L and 10R, and ends a series of operations.

In Step S3, the voltage estimation section 103 predicts the tendency of a change in the voltage of the high voltage DC line 56 according to the traveling state of the vehicle body (torques TL and TR and the rotational speeds ωL and ωR of the traveling motors 10L and 10R) and the actual voltage V of the voltmeter 55. The voltage estimation section 103 estimates from the predicted tendency, the voltage V* of the high voltage DC line 56 after a predetermined time is from the current time by a calculation expression to be described later. In Step S4, the DC/DC drive determination section 104 compares the estimated voltage V* with the threshold Vth. If the voltage V* is smaller than the threshold Vth (No in S4), a series of operations is completed. If the voltage V* is equal to or more than the threshold Vth, the process proceeds to Step S5. In Step S5, the DC/DC control section 105 outputs a control command to the DC/DC converter 60 and ends a series of operations. The power controller 51 repeatedly performs the operations in Steps S1 to S5 in a predetermined cycle (for example, every 10 ms) until the activation of the vehicle body starts and then stops. In other words, the power controller 51 sequentially acquires the detection data of the torque sensor 25, the rotational speed sensor 26, and the voltmeter 55, estimates the voltage V* after a predetermined time ts, and controls the DC/DC converter 60.

Figure 5:
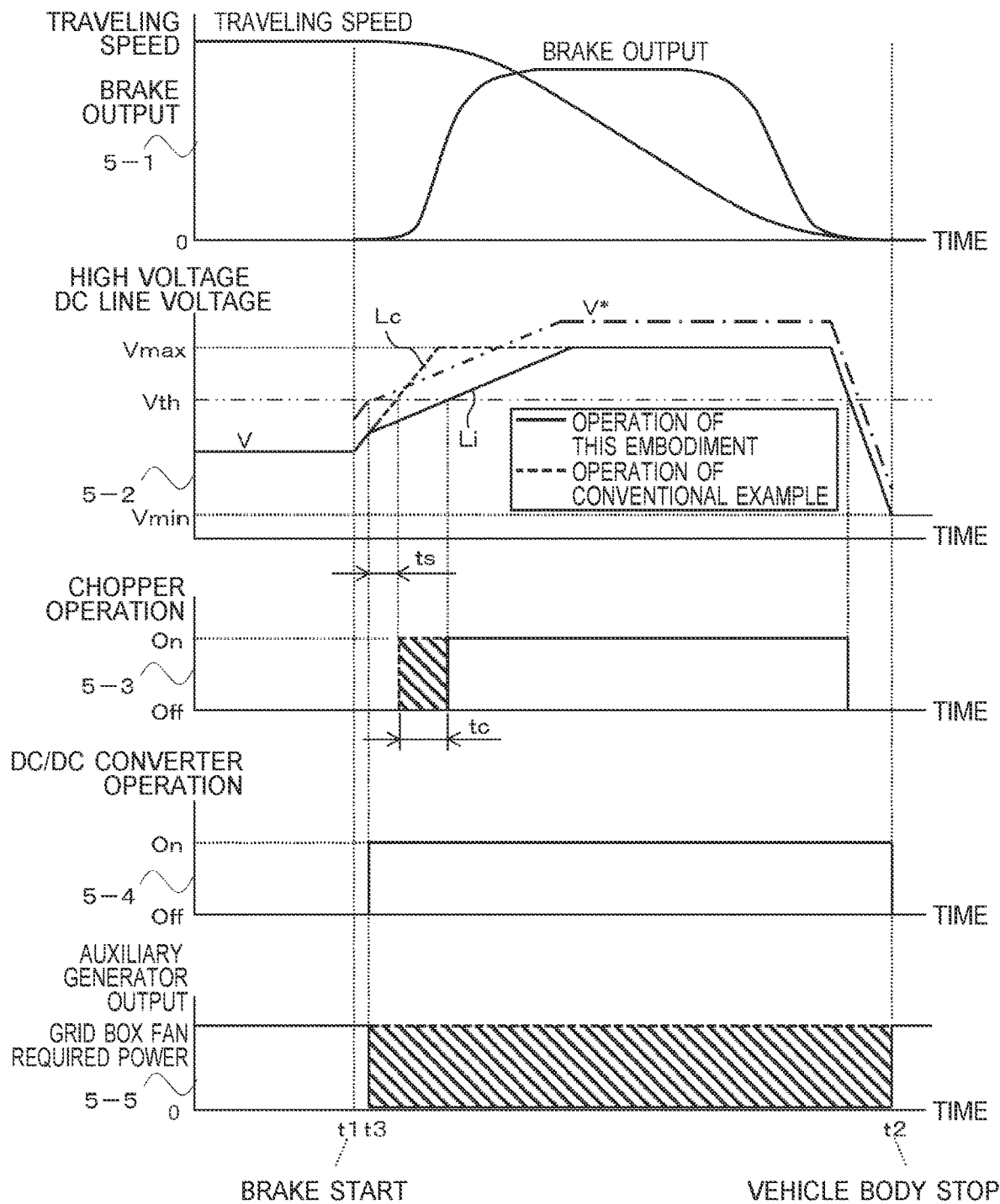
FIG. 5 is a time chart showing changes in vehicle operation in time series.

Next, differences between the vehicle body operation in the present embodiment and the vehicle body operation in the conventional example will be described with reference to FIG. 5. FIG. 5 is a time chart showing changes in vehicle body operation in time series. In this example, in order to simplify the description, the braking operation at the time of stopping the vehicle body will be described as an example. As shown in a graph 5-1 of FIG. 5, when the dump truck 100 travels at a certain traveling speed, if the braking is started at a time t1, the traveling speed gradually decreases and the dump truck 100 stops at a time t2.

At this time, as indicated by a dashed line Lc in a graph 5-2, in the conventional example, the actual voltage V of the high voltage DC line 56 starts to rise from the time t1 and rises to a maximum voltage Vmax. During this time, after ts seconds of a time t3, the actual voltage V indicated by a dashed line Lc is larger than the threshold Vth (actual voltage V>threshold Vth), and at a timing after ts seconds of the time t3, as indicated by a dashed line in a graph 5-3, the chopper 16 operates, and an electric power generated by the traveling motors 10L and 10R is consumed by the grid box resistors 53.

On the other hand, in the present embodiment, the power controller 51 sequentially calculates the voltage V* of the high voltage DC line 56 after a predetermined time ts from the current time, and predicts the voltage V* after ts seconds from the current time as indicated by a one-dot chain line (the details will be described later). The predetermined time ts is an arbitrary time set shorter than a time from a braking start (t1) to an intersection point of an approximate curve in a region where a change in braking output (refer to graph 5-1) is linear and a time axis.

Then, when the predicted voltage V*>the threshold Vth (time t3), the DC/DC converter 60 is turned on (graph 5-4), and an electric power is supplied to the auxiliary device DC line 57 from the high voltage DC line 56 through the DC/DC converter 60. The grid box fan motors 54 are driven by the electric power (regenerated power) generated by the traveling motors 10L and 10R. As a result, the output of the auxiliary generator 13 becomes almost zero. As a result, a rise of the voltage of the high voltage DC line 56 becomes slower than a voltage rise (a dashed line Lc) of the conventional example, and as indicated by a graph 5-3, the operation of the chopper 16 is delayed by a time tc as compared with the conventional example.

Therefore, in the present embodiment, the power consumption time of the grid box resistors 53 is shortened, and the operation time of the grid box fan motors 54, which are auxiliary devices, is extended. Also, once the DC/DC converter 60 operates, the DC/DC converter 60 continues to operate until the braking operation by the traveling motors 10L and 10R ends. As a result, since the DC/DC converter 60 supplies an electric power to the grid box fan motors 54 from the time t3 to the time t2, a load of the auxiliary generator 13 and hence the engine 11 can be reduced by an area of a hatched area in a graph 5-5, that is, (power required by grid box fans)×(t2-t3), and the fuel efficiency can be improved.

(Method of Estimating Voltage V*)

Figure 6:
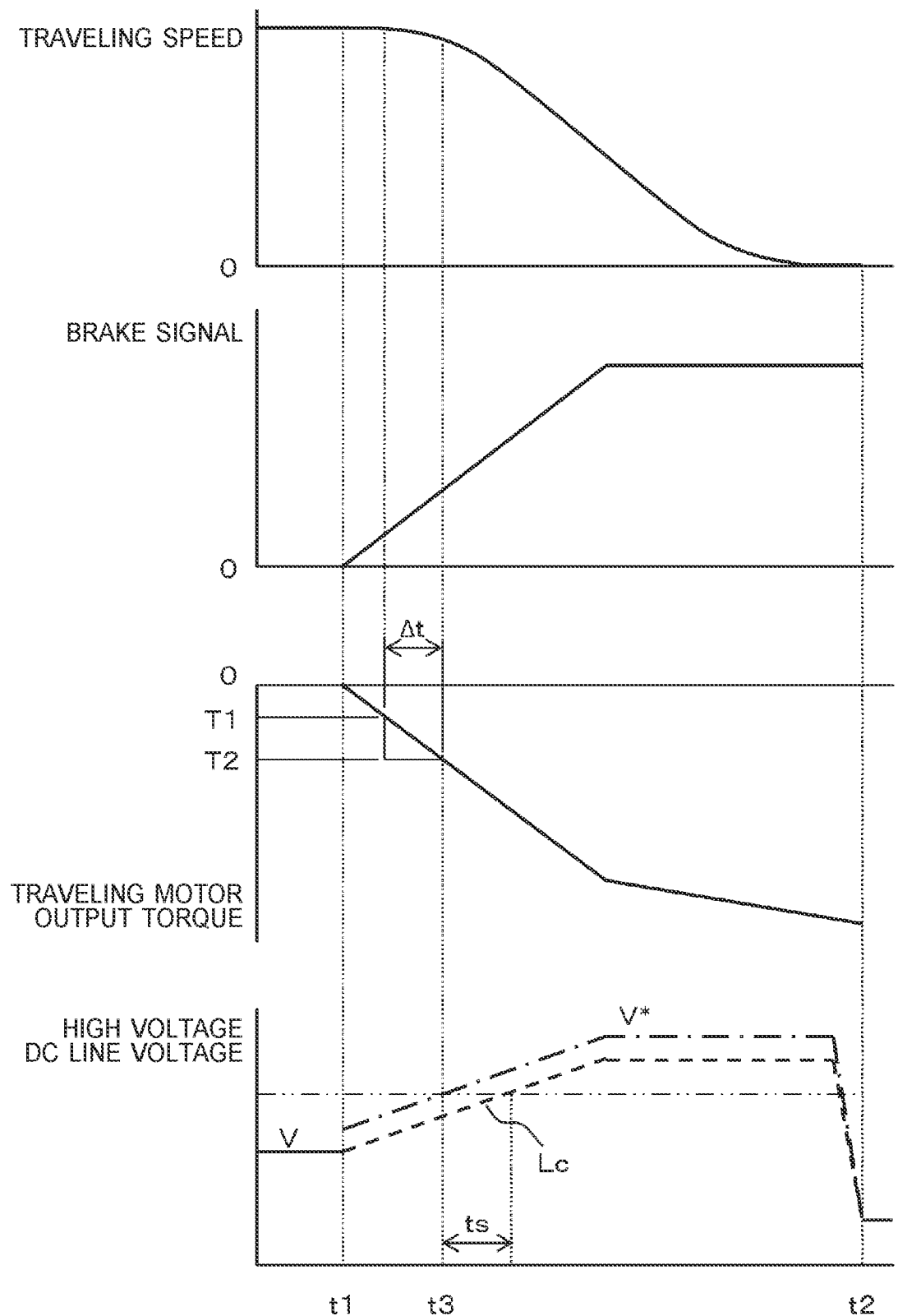
FIG. 6 is a diagram illustrating a method of estimating a voltage V*.

Next, a method of estimating the voltage V* will be described with reference to FIG. 6. FIG. 6 is a diagram illustrating a method of estimating the voltage V*. First, the voltage estimation section 103 sequentially acquires the traveling state of the vehicle body, for example, the output torques TL and TR and rotational speeds ωL, and ωR of the traveling motors 10L and 10R, and the actual voltage V output from the voltmeter 55.

Then, the voltage estimation section 103 predicts a tendency of a change in the voltage of the high voltage DC line 56 from the output torques TL, Tr, the rotational speeds ωL, ωR, and the actual voltage V, which have been acquired. The brake pedal is depressed at the time t1 during traveling at a certain predetermined speed, and when a brake signal increases, the output torques of the traveling motors 10L and 10R increase toward a negative direction in order to decrease the speed, and the voltage of the high voltage DC line 56 also increases accordingly.

At that time, the voltage estimation section 103 stores the output torques of the traveling motors 10L and 10R in advance, and estimates a torque Ts after a predetermined time ts seconds through Expression (1) from a current output torque T2 and an output torque T1 before a certain time Δt.

$$Ts=(T2-T1)/\Delta t \times ts+T2 \quad (1)$$

Also, the voltage estimation section 103 stores the rotational speeds of the traveling motors 10L and 10R in advance, and estimates a rotational speed ωs after the predetermined time ts seconds through Expression (2) from a current rotational speed ω2 and a rotational speed ω1 before a certain time Δt.

$$\omega s=(\omega 2-\omega 1)/\Delta t \times ts+\omega 2 \quad (2)$$

The voltage estimation section 103 calculates a motor output Pms of the traveling motors 10L and 10R after the predetermined time ts through Expression (3) from the torque Ts and the rotational speed ωs after the predetermined time ts seconds.

$$Pms=Ts \times \omega s \quad (3)$$

Also, similarly, the voltage estimation section 103 calculates a current motor output Pm of the traveling motors 10L and 10R through Expression (4) from the current torque T2 and rotational speed ω2.

$$Pm=T2 \times \omega 2 \quad (4)$$

The voltage estimation section 103 calculates power generation amounts Pes and Pe of the respective traveling motors 10L and 10R through Expressions (5) and (6) from the motor output Pm and a power generation efficiency ηe.

$$Pe=Pm \times \eta e \quad (5)$$

$$Pes=Pms \times \eta e \quad (6)$$

In this example, the power generation efficiency ηe is a value determined according to the specifications and the use situations of the traveling motors 10L and 10R, such as an input voltage, a frequency, and an input current. The power generation efficiency ηe is stored in advance in the form of a table to determine each power generation amount with reference to the table for each use situation. The voltage estimation section 103 applies Expressions (5) and (6) for calculating the traveling motor power generation amounts Pe and Pes to the left and right traveling motors 10L and 10R, and calculates respective power generation amounts PesL, PesR, PeL, and PeR.

The voltage estimation section 103 estimates the voltage V* of the high voltage DC line 56 after the time is through Expression (7) from the power generation amounts PesL, Pesr, PeL, and PeR of those traveling motors 10L and 10R, a capacitance C of the high voltage DC line 56, and the actual voltage V from the voltmeter 55.

$$V=\{(PesL+PesR+PeL+PeR)/2 \times ts/C+V^2\}^{0.5} \quad (7)$$

With the above configuration, the tendency of a change in the voltage of the high voltage DC line 56 is derived from the state of the vehicle body, and the voltage V* after the predetermined time can be estimated. As a result, the DC/DC converter 60 can be activated before the chopper 16 is driven. Hence, the electric power generated by the traveling motors 10L and 10R can be supplied to the grid box fans (auxiliary devices) 19 before being consumed by the grid box resistors 53, voltage rise of the high voltage DC line 56 is reduced to delay the operation of the grid box resistors 53, and the electric power can be supplied to the grid box fans 19 for a longer time. This makes it possible to perform the output reduction of the auxiliary generator 13 which has generated the electric power for driving the grid box fan 19, the output reduction of the engine 11 for driving the auxiliary generator 13, thereby improving the fuel efficiency.

(Modification of the First Embodiment)

Figure 7:
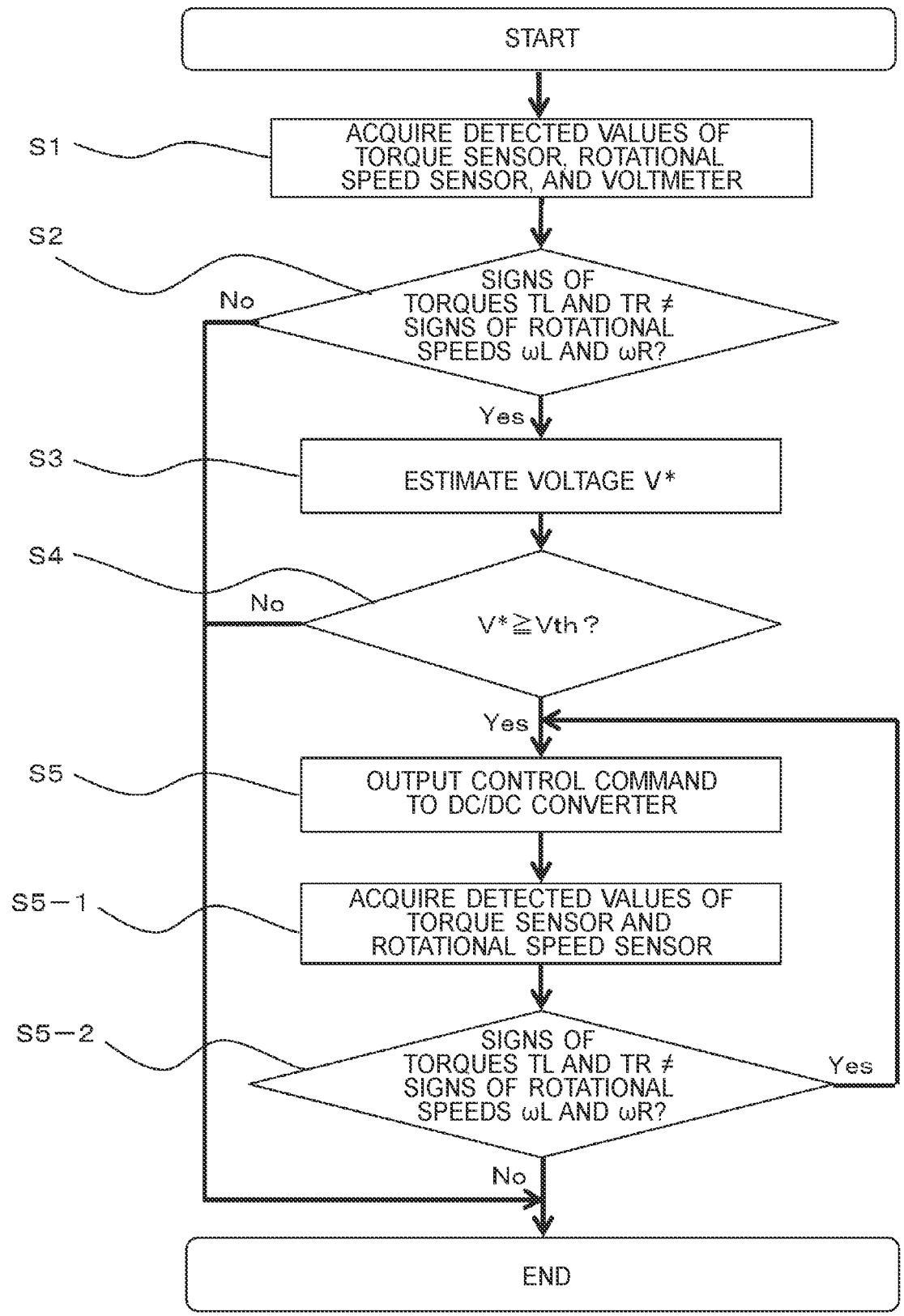
FIG. 7 is a flowchart showing a modification of the procedure of a control process of the DC/DC converter.

Next, a modification of the control process of the DC/DC converter will be described. FIG. 7 is a flowchart showing a modification of a procedure of a control process of the DC/DC converter. As shown in FIG. 7, the control process of the DC/DC converter according to the modification adds processing of Steps S5-1 and S5-2 to the processing shown in FIG. 4 after Step S5.

Specifically, in Step S5-1, the voltage estimation section 103 acquires the current traveling state of the vehicle body (torque and rotational speed). Then, in Step S5-2, similarly to Step S2, the traveling state determination section 102 determines whether or not the power generation is performed by the traveling motors 10L and 10R, and when the power generation is performed by the traveling motors 10L and 10R (yes in S5-2), the process returns to Step S5, and a control command is continuously output to the DC/DC converter 60. On the other hand, when the power generation is not performed by the traveling motors 10L and 10R (no in S5-2), a series of operations are ended.

With the addition of those processes, only the determination of whether or not the output of the control command to the DC/DC converter 60 and the regeneration operation continue is repeated while the regeneration operation of traveling motors 10L and 10R continues. As a result, the estimation of the voltage V* (S3), the process of comparing the voltage V* with the threshold Vth (S4) can be omitted, and the control speed can be improved.

Second Embodiment

Figure 8:
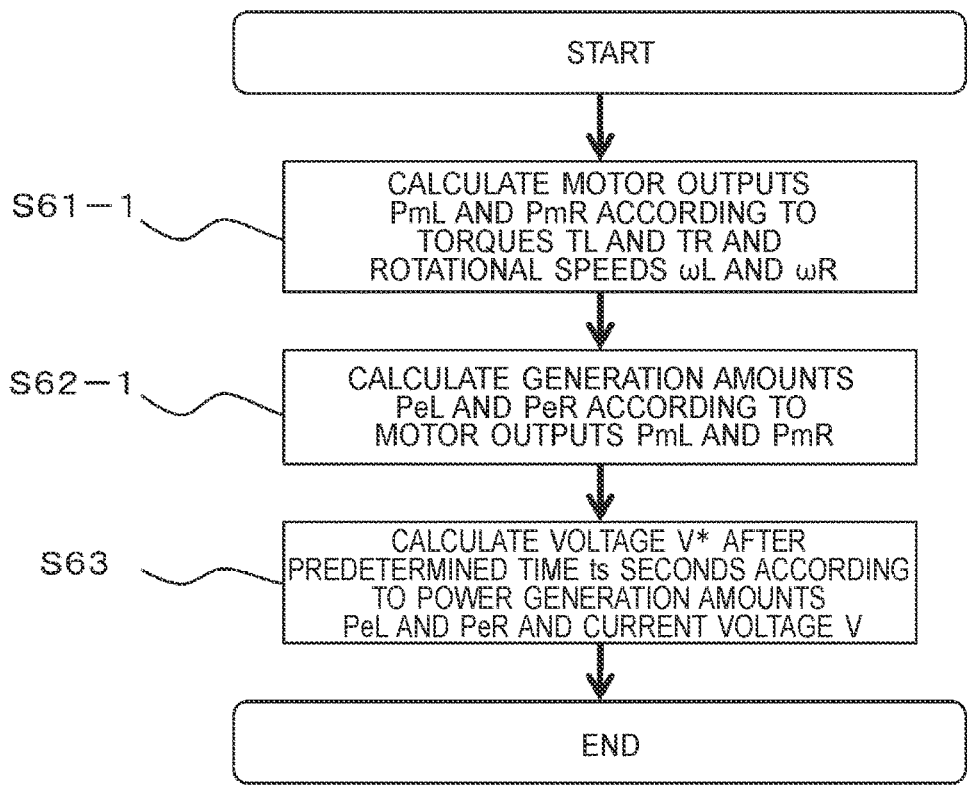
FIG. 8 is a flowchart showing a procedure of a method of estimating a voltage V* according to a second embodiment.

Next, a second embodiment of the present invention will be described. The second embodiment is different from the first embodiment in the method of estimating the voltage V*. Hereinafter, the difference will be described. FIG. 8 is a flowchart showing a procedure of the method of estimating the voltage V* according to the second embodiment. In the second embodiment, a voltage estimation section 103 calculates the voltage V* without using a power generation amount Pes after a predetermined time is seconds to reduce a calcuation load, which is different from the method of estimating the voltage* in the first embodiment.

As shown in FIG. 8, when the process is started, in Step S61-1, the voltage estimation section 103 calculates outputs PmL and PmR of traveling motors 10L and 10R from sequentially acquired vehicle body information, such as torque TL and TR of traveling motors 10L and 10R and rotational speeds ωL and ωR through the following Expression (8).

$$PmL=TL \times \omega L (PmR=TR \times \omega R) \quad (8)$$

In Step S62-1, the voltage estimation section 103 calculates power generation amounts PeL and PeR of the traveling motors 10L and 10R through the following Expression (9) from the outputs PmL and PmR of the traveling motors 10L and 10R, and a power generation efficiency ηe.

$$PeL=PmL \times \eta e (PeR=PmR \times \eta e) \quad (9)$$

In Step S63, the voltage estimation section 103 estimates the voltage V* input to high voltage DC line inverters 15L and 15R after a predetermined timt is seconds through Expression (10) from the power generation amounts PeL and PeR of the traveling motors 10L and 10R, a disturbance P1, an electrostatic capacitance C of the high voltage DC line 56, and an actual voltage V output from a voltmeter 55. The disturbance P1 indicates an electric power necessary for driving the loads other than the traveling motors 10L and 10R and grid box resistors 53 connected to the high voltage DC line 56.

$$V^*=\{(PeL+PeR-P1) \times ts/C+V^2\}^{0.5} \quad (10)$$

As described above, according to the second embodiment, the same advantages as those of the first embodiment can be obtained, and the calculation load of the power controller 51 when the voltage V* is estimated can be reduced compared to the first embodiment.

Third Embodiment

Figure 9:
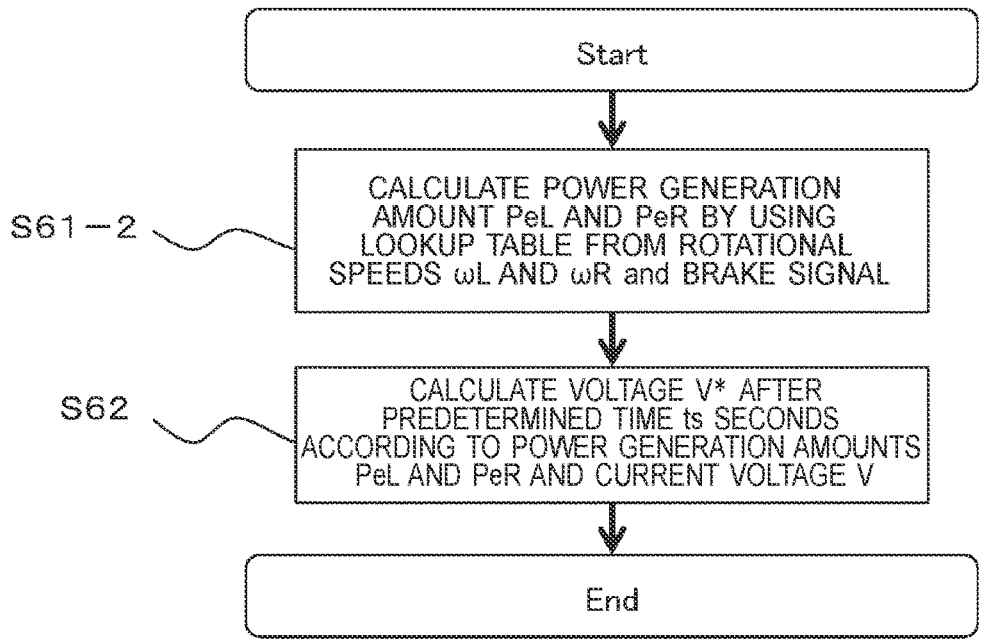
FIG. 9 is a flowchart showing a procedure of a method of estimating a voltage V* according to a third embodiment.

Next, a third embodiment of the present invention will be described. The third embodiment is different from the first and second embodiments in the method of estimating the voltage V*. Hereinafter, the difference will be described. FIG. 9 is a flowchart showing a procedure of the method of estimating the voltage V* according to the third embodiment. In the third embodiment, a voltage estimation section 103 omits the steps of calculating outputs PmL and PmR of traveling motors 10L and 10R using torques TL and TR, and obtains power generation amounts PeL and PeR of the traveling motors 10L and 10R from rotational speeds ωL and ωR of the traveling motors, a brake signals, and a lookup table LUT, and a calculation load is further reduced more than that in the second embodiment.

Specifically, as shown in FIG. 9, the voltage estimation section 103, in Step S61-2, obtains the power generation amounts PeL and PeR of the traveling motors 10L and 10R with reference to the lookup table LUT stored in advance, from successively acquired vehicle information, for example, absolute values of the rotational speeds ωL and ωR of the traveling motors 10L and 10R, and a brake signal ωR.

The lookup table LUT is stored in advance in a storage device 52 in the power controller 51 (refer to FIG. 2).

Figure 10:
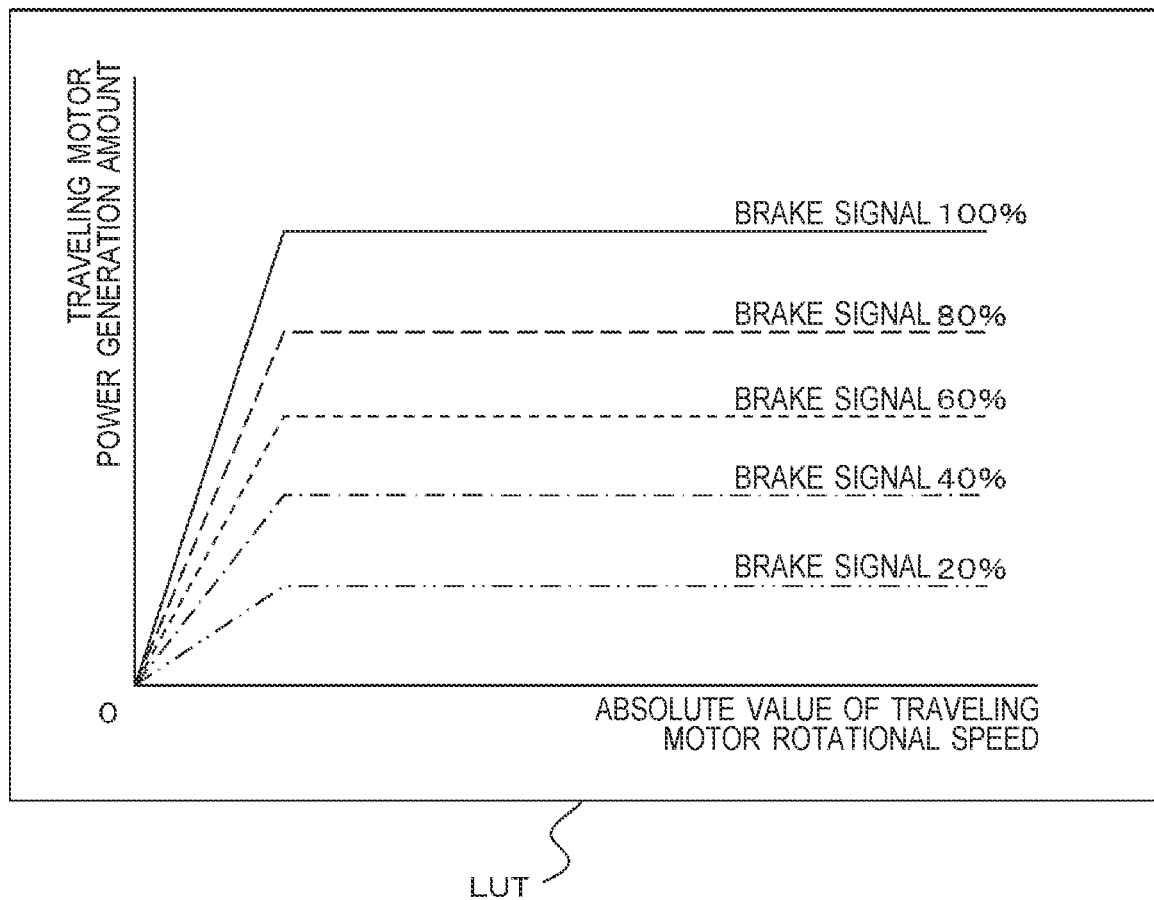
FIG. 10 is a diagram showing a lookup table used when estimating the voltage V* in the third embodiment.

FIG. 10 is a diagram showing a lookup table used when estimating the voltage V* in the third embodiment. As shown in FIG. 10, in the lookup table LUT, a relationship among the rotational speeds of the traveling motors 10L and 10R, the brake signal, and the power generation amounts of the traveling motors 10L and 10R is defined. In FIG. 10, a horizontal axis represents absolute values of the rotational speed of the traveling motors 10L and 10R, and a vertical axis represents the amount of power generation of the traveling motors 10L and 10R, and line types represent differences for each brake signal. The lookup table LUT is created according to the output characteristics and the control characteristics of the traveling motors 10L and 10R, and can be created when the traveling motors 10L, 10R and the control specifications are determined.

Then, in the same manner as that in the second embodiment, in Step S62, the voltage estimation section 103 calculates the voltage V* input to the high voltage DC line inverters 15L and 15R after a predetermined time is second through Expression (11).

$$V^*=\{(PeL+PeR-P1) \times ts/C+V^2\}^{0.5} \quad (11)$$

As described above, in the third embodiment, in addition to the same advantages as those in the second embodiment, the power generation amount is obtained from the lookup table LUT based on the rotational speeds of the traveling motors 10L and 10R and the brake signal, thereby reducing the sensors and processing required, and improving the control responsiveness.

The present invention is not limited to the embodiments described above, but includes various modifications. For example, the embodiments described above are described in detail to described the present invention in an easy-to-understand manner, and is not necessarily limited to one having all the described configurations.

For example, in the embodiments described above, in order to determine whether there is the regenerative operation by the traveling motors 10L and 10R, the rotational speed and torque of the traveling motors 10L and 10R are used, but the present invention is not limited to the above configuration, and it may be determined whether or not there is the regenerative operation according to the rotational speed of the traveling motors 10L and 10R and the brake signal. In each embodiment, the grid box fan motors 54 are used to supply the electric power from the DC/DC converter 60. However, the present invention is not limited to the above configuration, and the grid box fan motors 54 may be used to supply the electric power to another auxiliary device, or may be used to supply the electric power to a plurality of auxiliary devices.

LIST OF REFERENCE SIGNS 10L, 10R: traveling motor
11: engine
12: main generator (first generator)
13: auxiliary generator (second generator)
15L, 15R: high voltage DC line inverter
16: chopper
17: auxiliary generator diode bridge
18: auxiliary device DC line inverter
19: grid box fan (auxiliary device)
21: main generator diode bridge
49: controller
50: main controller 51: power controller
52: storage device
53: grid box resistor (resistor)
54: grid box fan motor
55: voltmeter (voltage detector)
56: high voltage DC line
57: auxiliary device DC line
60: DC/DC converter (step-down device)
101: resistor drive determination section
102: traveling state determination section
103: voltage estimation section
104: DC/DC drive determination section (step-down device drive determination section)
105: DC/DC control section (step-down device control section)
C1: first electric circuit
C2: second electric circuit
LUT: lookup table

The invention claimed is:

1. A power regeneration system for a work vehicle comprising:
   a first generator and a second generator which are driven by an engine;
   a first electric circuit for supplying an electric power generated by the first generator to a traveling motor connected to a driving wheel of the work vehicle;
   a resistor that is connected to the first electric circuit and converts an electric energy generated at the time of braking of the traveling motor into a heat energy and radiates a heat energy;
   a voltage detector that detects an actual voltage of the first electric circuit;
   a second electric circuit for supplying an electric power generated by the second generator to an auxiliary device of the work vehicle;
   a step-down device that has a high voltage side connected to the first electric circuit and a low voltage side connected to the second electric circuit, and supplies the electric power from the first electric circuit to the second electric circuit; and
   a controller that controls driving of the step-down device,
   wherein the auxiliary device operates upon being supplied with at least one of the electric power generated by the second generator and not reduced by the step-down device, and the electric power generated by regeneration of the traveling motor and reduced by the step-down device, and
   the controller includes:
      a traveling state determination section that determines whether or not the traveling motor performs the regenerative operation, based on information on a traveling state of the work vehicle;
      a voltage estimation section that estimates a voltage of the first electric circuit after a predetermined time from the present time, based on the information on the traveling state of the work vehicle and the actual voltage detected by the voltage detector;
      a step-down device drive determination section that determines whether or not the voltage estimated by the voltage estimation section is equal to or more than the threshold, and determines that the step-down device is driven when the voltage estimated by the voltage estimation section is equal to or more than the threshold;
      a step-down device control section that outputs a drive command to the step-down device before the actual voltage becomes equal to or more than the threshold when the traveling state determination section determines that the traveling motor performs the regeneration operation and the step-down device drive determination section determines that the step-down device is driven; and
      a resistor drive determination section that determines whether or not the actual voltage is equal to or more than the predetermined threshold, and outputs a drive command to the resistor after the drive command is output from the step-down device control section and when the actual voltage becomes equal to or more than the threshold.

2. The power regeneration system for a work vehicle according to claim 1, wherein the traveling state determination section determines whether or not the traveling motor performs the regeneration opration, based on an output torque of the traveling motor and the rotational speed of the traveling motor as the information on the traveling state of the work vehicle.

3. The power regeneration system for a work vehicle according to claim 2,
   wherein the voltage estimation section
   sequentially acquires the torque of the traveling mntor and the rotational speed of the traveling motor,
   estimates the torque of the traveling motor and the rotational speed of the traveling motor after the predetermined time has elapsed according to a tendency of a change in the torque of the traveling motor and the rotational speed of the traveling motor,
   calculates a power generation amount of the traveling motor according to the estimated torque of the traveling motor and the estimated rotational speed of the traveling motor, and
   estimates a voltage of the first electric circuit after the predetermined time has elapsed, based on the calculated power generation amount of the the traveling motor and the actual voltage detected by the voltage detector.

4. The power regeneration system for a work vehicle according to claim 2,
   wherein the voltage estimation section
   sequentially acquires the torque of the traveling motor and the rotational speed of the traveling motor,
   calculates the power generation amount of the traveling motor according to the acquired torque of the traveling motor and the acquired rotational speed of the traveling motor, and
   estimates the voltage of the first electric circuit after the predetermined time has elapsed, based on the calculated power generation amount of the traveling motor and the actual voltage detected by the voltage detector.

5. The power regeneration system for a work vehicle according to claim 2,
   wherein the voltage estimation section
   sequentially acquires the rotational speed of the traveling motor and the brake signal,
   calculates the power generation amount of the traveling motor corresponding to the acquired rotational speed of the traveling motor and the braking signal with reference to a lookup table in which a relationship between the rotational speed of the traveling motor and the power generation amount of the traveling motor is defined in advance for each of the brake signals, and
   estimates the voltage of the first electric circuit after the predetermined time has elapsed, based on the calculated power generation amount of the the traveling motor, and the actual voltage detected by the voltage detector.

\* \* \* \* \*